(12) United States Patent
Marini

(10) Patent No.: US 10,202,235 B2
(45) Date of Patent: *Feb. 12, 2019

(54) DISPOSABLE SEALANT LIQUID CANISTER FOR AN INFLATABLE ARTICLE REPAIR AND RELATIVE PRODUCTION METHOD

(71) Applicant: TEK GLOBAL S.R.L., Pesaro (IT)

(72) Inventor: Maurizio Marini, Pesaro (IT)

(73) Assignee: TEK GLOBAL S.R.L., Pesaro (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/911,311

(22) PCT Filed: Aug. 12, 2014

(86) PCT No.: PCT/IB2014/063866
§ 371 (c)(1),
(2) Date: Feb. 10, 2016

(87) PCT Pub. No.: WO2015/022630
PCT Pub. Date: Feb. 19, 2015

(65) Prior Publication Data
US 2016/0194144 A1  Jul. 7, 2016

(30) Foreign Application Priority Data

Nov. 5, 2013  (IT) ............................... TO2013A0900

(51) Int. Cl.
*B65D 85/00* (2006.01)
*B29C 73/16* (2006.01)
(Continued)

(52) U.S. Cl.
CPC .............. *B65D 85/70* (2013.01); *B29C 65/06* (2013.01); *B29C 73/166* (2013.01);
(Continued)

(58) Field of Classification Search
CPC ............................. B29C 73/166; B29C 65/06
(Continued)

(56) References Cited

U.S. PATENT DOCUMENTS

| 5,031,384 A | 7/1991 | Rebeyrolle et al. |
| 7,694,698 B2 * | 4/2010 | Marini .................. B29C 73/166 141/38 |

(Continued)

FOREIGN PATENT DOCUMENTS

| CN | 1925928 A | 3/2007 |
| DE | 10 2007 026 776 A1 | 12/2008 |

(Continued)

OTHER PUBLICATIONS

WO 2013/103055 A1 English Abstract.
(Continued)

*Primary Examiner* — Timothy L Maust
(74) *Attorney, Agent, or Firm* — Ladas & Parry LLP

(57) ABSTRACT

A disposable canister filled with sealant liquid has an inner closure for retaining the sealant liquid inside the canister; a compressed-air inlet conduit; an outlet conduit for receiving the sealant liquid when the closure is in an open position; a first portion having one of the inlet and outlet conduits; and a second portion; the first and second portions being joined by a weld to form a tank which holds the sealant liquid in a ready-for-use position by means of the closure.

24 Claims, 3 Drawing Sheets

(51) Int. Cl.
*B29C 65/06* (2006.01)
*B65B 7/28* (2006.01)
*B65D 25/38* (2006.01)
*B65D 53/06* (2006.01)
*B29L 31/00* (2006.01)

(52) U.S. Cl.
CPC ............ *B65B 7/2878* (2013.01); *B65D 25/38* (2013.01); *B65D 53/06* (2013.01); *B29L 2031/712* (2013.01); *Y10T 29/49968* (2015.01)

(58) Field of Classification Search
USPC .................................. 141/3, 20, 38, 100, 104
See application file for complete search history.

(56) References Cited

U.S. PATENT DOCUMENTS 8,201,586 B2 * 6/2012 Yoshida ................ B29C 73/166
141/105
2008/0092984 A1 4/2008 Marini

FOREIGN PATENT DOCUMENTS

| EP | 2 030 767 A1 | 3/2009 |
| EP | 2 792 473 A1 | 10/2014 |
| JP | 2004-520232 A | 7/2004 |
| JP | 2008-23977 A | 2/2008 |
| JP | 2008-155400 A | 7/2008 |
| JP | 2009-240653 A | 10/2009 |
| JP | 2013-141744 A | 7/2013 |
| WO | 2005/084968 A2 | 9/2005 |
| WO | 2013/103055 A1 | 7/2013 |

OTHER PUBLICATIONS

DE 10 2007 026 776 A1 English Abstract.
Non-English Japanese Office Action with English translation dated Mar. 13, 2018 for Japanese Application No. 2016-533978.
Espacenet English abstract of JP 2013-141744 A.
Espacenet English abstract of WO 02/38457 A1 which corresponds to JP 2004-520232 A.
Espacenet English abstract of JP 2008-23977 A.
Espacenet English abstract of JP 2008-155400 A.
Non-English Japanese Office Action with English translation dated Jul. 10, 2018 for Japanese Application No. 2016-533978.
Espacenet English abstract of JP 2009-240653 A.
Non-English Chinese Office Action with English translation dated Jun. 15, 2017 for Chinese Application No. 201480055659.5.
Espacenet English abstract of CN 1925928 A.

* cited by examiner

DISPOSABLE SEALANT LIQUID CANISTER FOR AN INFLATABLE ARTICLE REPAIR AND RELATIVE PRODUCTION METHOD

RELATED APPLICATION

This application is a national phase entry under 35 USC 371 of International Patent Application No PCT/IB2014/063866 filed on 12 Aug. 2014, which claims priority from U.S. patent application Ser. No. 13/964,477 filed 12 Aug. 2013 and is thereby a continuation-in-part thereof and Italian Patent Application No.: TO2013A000900 filed 5 Nov. 2013.

TECHNICAL FIELD

The present invention relates to a disposable sealant liquid canister or container for an inflatable article, e.g. vehicle tyre, repair and inflation kit.

BACKGROUND ART

A sealant liquid canister comprises an air inlet and a sealant liquid and/or air outlet, and defines an inner volume or tank filled with sealant liquid.

A user-safe canister is needed, designed to also prevent accidental sealant liquid leakage as a result, for example, of tampering.

EP-A1-2030767 relates to a sealant liquid canister having a tank defined by a bottle, inside which the sealant liquid is retained by means of a sealed film. The film is piereced by means of a manually actuated punch. The tank is associated by welding to a fluidic element comprising a pressurized air inlet and an outlet for injecting sealant liquid and then pressurized air. The welding is obtained after the sealant liquid has been closed in the tank by applying the film.

DISCLOSURE OF INVENTION

According to the present invention, there is provided a disposable sealant liquid canister for an inflatable article repair and inflation kit.

According to the present invention, there is further provided a compact container.

According to the present invention, there are provided a disposable sealant liquid canister for an inflatable article repair and inflation kit, as claimed in claim 1, and a relative production method as claimed in claim 19.

BRIEF DESCRIPTION OF THE DRAWINGS

A non-limiting embodiment of the invention will be described by way of example with reference to the attached drawings, in which.

BEST MODE FOR CARRYING OUT THE INVENTION

Figure 1:
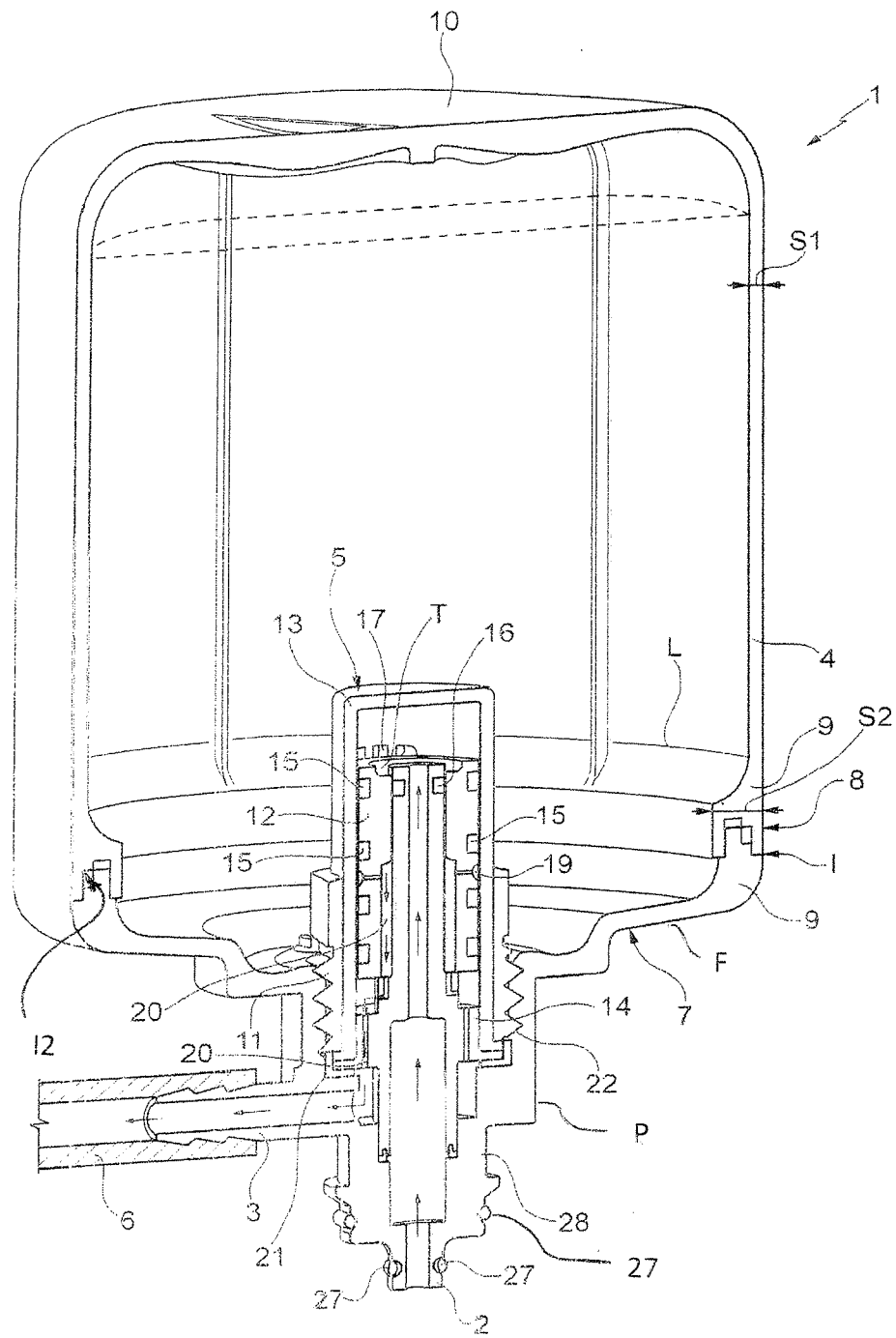
FIG. 1 shows a perspective view with a longitudinal section of a disposable canister in accordance with the present invention.

Number 1 in FIG. 1 indicates a disposable sealant liquid canister having an inlet conduit 2 connectable to a compressed-air source; an outlet conduit 3 connectable to an inflatable article, such as a tyre; and a tank 4 filled with sealant liquid. Canister 1 also comprises a closure 5 for retaining the sealant liquid inside tank 4 and preventing it from flowing accidentally, by gravity or otherwise, into inlet conduit 2 and/or outlet conduit 3. In a ready-for-use position, i.e. in which the sealant liquid is injected when the inlet conduit is pressurized, closure 5 is located below the surface of the sealant liquid, which thus exerts hydrostatic pressure on the stopper.

Canister 1 preferably also comprises a disposable tube 6 fixed rigidly and irreversibly, e.g. by means of a clamp or metal or plastic collar, to outlet conduit 3. Tube 6 may be a hose, and may comprise a releasable connector (not shown), e.g. a ring nut or a press-on, lever-activated connector, for connection to a tyre valve to inject sealant liquid or air. Tube 6 is thus also changed with the rest of canister 1 after the sealant liquid is injected and/or exceeds its use-by date. Canister 1 preferably forms a disposable part of a kit, which also comprises a stand (not shown) connectable to a pressure source to hold the canister in a sealant-injection position; and/or a portable electric compressor (not shown) for generating airflow along an air line into inlet conduit 2.

Canister 1 is produced so that inlet and outlet conduits 2 and 3 and tank 4 form a single welded body, more specifically with one weld. Advantageously, the sealant liquid is retained inside the tank 4 by means of the sealing in addition to the closure 5.

Accordingly, canister 1 comprises a first portion 7 defining at least one of inlet and outlet conduits 2 and 3; and a second portion 8, one of first or second portions 7 and 8 being concave to contain all the sealant liquid in a welding position.

First and second portions 7 and 8 are made, e.g. molded, from the same polymer material. Preferably, the molding is injection molding for making both portions 7, 8. And the weld is a friction weld, in particular a rotation friction weld. In which case, the weld interface between first and second portions 7 and 8 is circular.

The weld is preferably a butt weld and, when made by friction, the thickness S2 of at least one weld area 9 of at least one of first and second portions 7 and 8 is greater than the minimum thickness S1 of relative portion 7, 8. More specifically, the weld area 9 defines an interface I along which first and second portions 7 and 8 are contacting prior to welding. The weld areas 9 may be male and female respectively, and engaged one inside the other to position the first and second portions correctly for welding. Preferably, in case of butt welding, the interface I comprises a front portion I1 (FIG. 2), which is housed in a female front portion I2. The front portion I2 is recessed with respect to the thickness S2 of the second portion 8 and the front portion I1 is in relief with respect to the thickness of the first portion 7.

Preferably, the first portion 7 comprises a protuberance P defining either the inlet 2 or the outlet 3 or both, and a flange F extending radially from the protuberance P. The weld is arranged between the flange F and the second portion 8 (FIG. 1).

In the FIG. 1 embodiment, weld area 9 of second portion 8 is located far enough from the top end 10 of second portion 8 to form a concave shape in which to contain all the sealant liquid in the welding position.

The welding position of second portion 8 is preferably inverted with respect to the position in FIG. 1, and the surface of the sealant liquid in the welding position reaches but does not exceed weld area 9 of second portion 8. The concavity of second portion 8 in the welding position is large enough to contain by gravity enough sealant liquid for repair purposes, e.g. to repair a flat tyre. Line L in FIG. 1 indicates an approximate surface level of the sealant liquid when second portion 8 is in the welding position on a horizontal surface.

First portion 7 preferably comprises inlet conduit 2, outlet conduit 3, and relative weld area 9 in one piece. And, in the FIG. 1 embodiment, closure 5, when closed, is connected to first portion 7 to keep the sealant liquid inside tank 4, and to isolate tank 4 from both inlet conduit 2 and outlet conduit 3 until the stopper is released.

Closure 5 is advantageously irreversible, i.e. can be opened to fluidically connect inlet conduit 2 and outlet conduit 3 via tank 4, but cannot be closed again by the user. This simplifies the design of closure 5 and reduces production cost.

Closure 5 may be a preassembled unit manufactured separately from the other component parts of canister 1, and comprises a connector 11 for anchoring to first portion 7. Closure 5 preferably comprises a shutter 12 for closing tank 4 towards inlet conduit 2 and/or outlet conduit 3. Shutter 12 is connected to first portion 7 by connector 11, and is fitted to the latter.

In the FIG. 1 embodiment, shutter 12 is housed inside a casing 13, and is movable with respect to a sleeve 14. Casing 13 and sleeve 14 are connected rigidly to first portion 7 by connector 11, and shutter 12 slides, guided by casing 13 and/or sleeve 14.

Seals 15 carried by shutter 12 and sliding along casing 13 and seals 16 between shutter 12 and sleeve 14 are provided.

Figure 2:
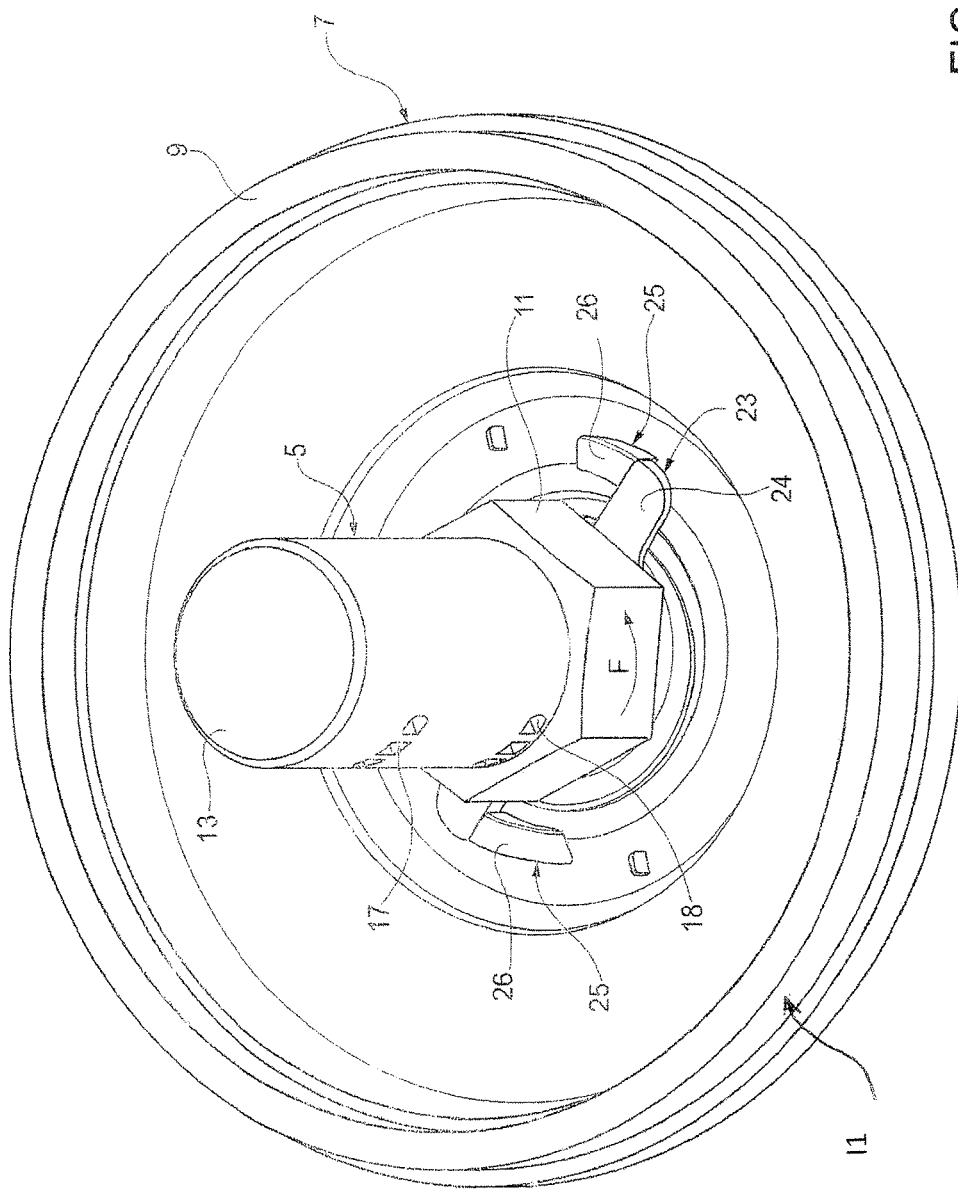
FIG. 2 shows a perspective view of a detail of FIG. 1.

Casing 13 has one or more inlets 17 and one or more outlets 18 (FIG. 2). Sleeve 14 is hollow to connect inlet conduit 2 to inlets 17 when shutter 12 is in an open position (FIG. 1). In the open position, outlets 18 are connected to outlet conduit 3 by movable channels 19 on shutter 12, and by fixed channels 20 defined by or between sleeve 14, shutter 12 and casing 13. In the open position, movable channels 19 are connected to fixed channels 20, and seals 15 isolate inlets 17 from outlets 18 inside casing 13.

In a closed position, i.e. that in which closure 5 is assembled, shutter 12 closes both inlets 17 and outlets 18 with respect to inlet and outlet conduits 2 and 3 by means of seals 15 and 16. More specifically, one seal 15 separates sleeve 14 fluidically from inlets 17, and other seals 15 close outlets 18 and disconnect the latter from movable channels 19. In the closed position (FIG. 3), shutter 12 is positioned higher than in the FIG. 1 position. To move it into the open position, shutter 12 is pushed downwards by high pressure exerted on the head T of shutter 12 inside casing 13, and which is generated by a pressure source connected to inlet conduit 2. When shutter 12 is in the open position, the high pressure flows into tank 4 through inlets 17, and so pushes the sealant liquid out through outlets 18, which are connected to the pressure of the article for repair. When the surface of the sealant liquid drops below outlets 18, the compressed air flows substantially towards outlet conduit 3.

A fixed seal 21 is also provided to prevent sealant liquid from leaking, between connector 11 and first portion 7, into outlet conduit 3.

Connector 11 is fitted to first portion 7 by a shape coupling, which is preferably a combination of a threaded connector 22 and a self-lock stop 23. Threaded connector 22 is preferably calibrated to exert pressure on seal 21 as it is torqued. Self-lock stop 23 comprises a combination of one or more flexible tabs 24 and asymmetrical stops 25. As the threaded connector is torqued, flexible tabs 24 flex up along sloping surfaces 26 on asymmetrical stops 25 until connector 11 comes to an axial stop with respect to first portion 7.

In the unscrew direction indicated by arrow F, stop surfaces on asymmetrical stops 25 intercept and prevent tabs 24 from flexing, thus preventing the threaded connector from being unscrewed.

Canister 1 is manufactured as follows.

First and second portions 7 and 8 are each molded, preferably each in one piece.

Closure 5 is fitted in the closed position to first portion 7.

Second portion 8, with weld area 9 facing up and top end 10 down, is filled with an amount of sealant liquid sufficient for repair, roughly to the level of line L.

First portion 7 is fitted to, to close, second portion 8 filled with sealant liquid, and the two are then welded.

Figure 3:
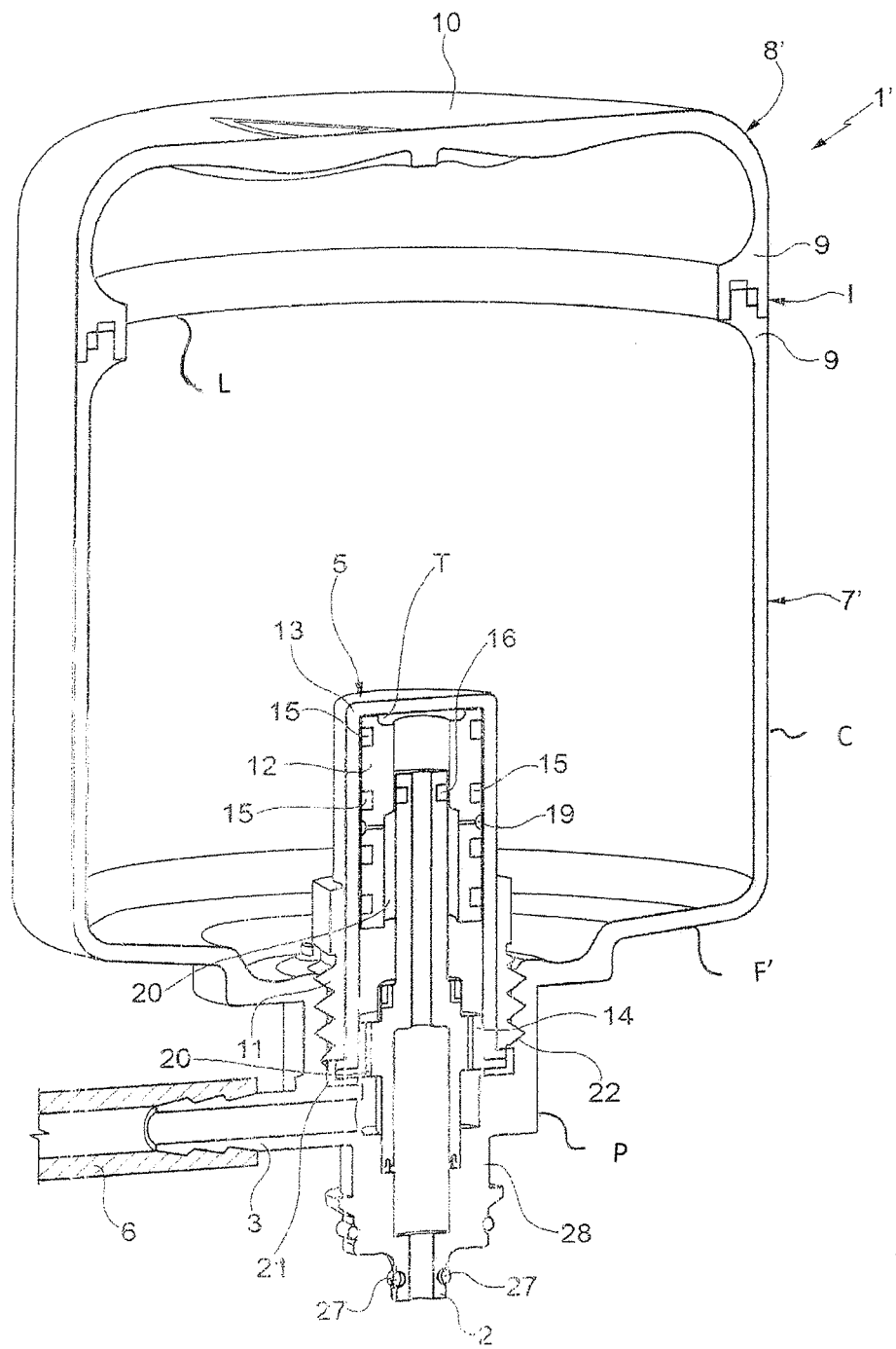
FIG. 3 shows a perspective view with a longitudinal section of a disposable canister in accordance with a further embodiment of the present invention.

FIG. 3 shows another embodiment of the present invention, in which a disposable canister 1' is the same as in FIG. 1, except that a first portion 7', when closed by closure 5, is concave to contain the repair amount of sealant liquid; and a second portion 8' is substantially in the form of a lid welded to first portion 7'. More specifically, weld area 9 of first portion 7' is located far enough from closure 5 to define a volume large enough to contain the repair amount of sealant liquid. In this embodiment, the welding position of first portion 7' is the one shown in FIG. 3. Preferably, flange F' of first portion 7' comprises a cylindrical wall C departing from the part opposite to protuberance P' to define the volume containing the sealant liquid both before and after welding.

In the embodiment of FIG. 3, closure 5 must be fitted inside first portion 7', to close inlet and outlet conduits 2 and 3, before first portion 7' is filled with the amount of sealant liquid suitable for repair, so as to retain the sealant liquid inside first portion 7' during the welding operation. FIG. 3 shows closure 5 in the closed position.

Apart from what is explicitly stated above, the component parts of canister 1' are the same as those of canister 1, as shown also by use of the same reference numbers with no superscripts.

The disposable canister 1, 1' according to the present invention has the following advantages.

The welding safeguards against any attempt to tamper with, and so enhances the safety of, sealant liquid canister 1. Closure 5, in particular, is protected inside the canister once this is welded, and so cannot be tampered with by the user or damaged. The sealant liquid is preferably poured into the canister before the latter is welded, so that, once welded, canister 1 is ready for use. The sealant liquid can therefore be inspected when it is already inside portion 8 or 7'. In particular, during assembly, the sealant liquid is exposed to the external environment when closure 5 is already fixed in the position of use.

This is particularly advantageous when closure 5 is irreversible, in that canister 1 is filled before being fitted with closure 5, which is therefore only opened for the repair function.

Furthermore, the welding is carried out in an area such to make the canister particularly compact. In particular, it is possible to house casing 13 so that the sides of the latter are immersed in the sealant liquid and to weld in an area far from closure 5 so as to prevent the heat generated during welding and/or the respective flashings from damaging the closure. This may occur in particular both in case of a moveable shutter, the guide of which may be deformed, and when materials with a low melting temperature are used, such as the material of the sealing rings or that of the sealing films.

Clearly, changes may be made to disposable canister 1, 1' as described and illustrated herein without, however, departing from the protective scope defined in the accompanying Claims.

Inlet and outlet conduits 2, 3 may be positioned differently from those shown in the drawings. Normally, at least one of inlet and outlet conduits 2, 3 is located beneath the sealant liquid surface level, where the sealant liquid is injected into the inflatable article for repair.

Closure 5 may also differ from the one shown. For example, closure 5 may comprise a reversible valve, which returns automatically to the closed position when injection of the sealant liquid is completed or interrupted, for example, by the user.

Though the description refers to a closure 5 opened by air pressure, i.e. a pneumatic shutter, other types also exist, both irreversible, such as tear film, and reversible, such as valves. In both cases, closure 5 may also be opened manually by the user, e.g. using release controls or tools.

First portion 7 is preferably designed to form a male or female element 28 of a releasable shape coupling for connection to a stand for supporting canister 1 in the injection position. Advantageously, the male or female element 28 is carried by the protuberance P. Even more preferably, first portion 7 comprises seals 27, in particular sealing rings, to define both a mechanical connection to a stand, and at the same time a fluidtight connection to the delivery side of the compressor. In the latter case, the sealing rings are fitted to inlet conduit 2, and the male or female element is also formed on inlet conduit 2. To this regard, male or female element 28 is configured to be connected to the compressor in two stages, i.e. in one stage a mechanical connection is executed to a support suitable for bearing the weight of canister 1 and for maintaining the latter in a ready-to-use position, e.g. a vertical position, preferably through a bayonet connection as disclosed in application WO-A1-20050850028; and a second stage where a fluidic connection of the pressure source with inlet conduit 2 is executed, preferably through a hose directly connected to canister 1. According to a further alternative embodiment, male or female element 28 is configured to provide both mechanical and fluidic connection with a single movement through a snap connection, the fluidic connection being preferably sealed by seals 27. In particular, the snap connection is such to connect canister 1 with a support bearing the weight of the canister 1 and such that canister 1 is maintained in a substantially vertical position of use. At the same time, the snap connection defines a fluid tight connection between inlet conduit 2 and a conduit that is fixed with respect to the pressure source and that receives pressurized air.

Connector 11 may advantageously be formed, e.g. molded, in one piece with casing 13.

When assembling shutter 5, at least seal 21 and sleeve 14 are fixed rotationally. Casing 13 may also be fixed as connector 11 is torqued; or, if both are formed in one piece, casing 13 rotates with respect to sleeve and seal 21 as connector 11 is torqued. Being compressed between sleeve 14 and first portion 7, seal 21 is thus compressed without any undue twisting.

Any other self-lock threaded means may be substituted for tabs 24.

The seal 27 next to outlet conduit 3 may be omitted.

The invention claimed is:

1. A disposable canister filled with sealant liquid said canister having a rigid body section and a neck section narrower than the body section, said neck section and comprising an inner closure for retaining said sealant liquid inside the canister, said closure being configured to be pressure-released by air pressure; a compressed-air inlet conduit; an outlet conduit for receiving the sealant liquid when said closure is in an open position; said canister comprising a first portion including said neck section forming one piece with at least one of said inlet and outlet conduits; and a second portion; wherein said first and second portions are joined by a weld located on the body section to form a tank which, by means of said closure, holds the sealant liquid in a ready-for-use position in which the sealant liquid exerts hydrostatic pressure on said closure and wherein said first portion comprises a protuberance having the inlet or the outlet and a flange departing radially from the protuberance, the welding being interposed between the flange and the second portion.

2. A canister according to claim 1, wherein the flange comprises a cylindrical wall opposite to the protuberance, the welding being interposed between the cylindrical wall and the second portion.

3. A canister as claimed in claim 1, wherein the closure comprises a casing having at least one inlet port connected to the inlet and at least one outlet port connected to the outlet and a moveable shutter housed in the casing to close the inlet and outlet in a closed position.

4. A canister as claimed in claim 1, wherein said weld is so located that said sealant liquid is retained by gravity inside one of said first and second portions.

5. A canister as claimed in claim 1, wherein said first and second portions are made of the same polymeric material.

6. A canister as claimed in claim 1, wherein said weld is a butt weld.

7. A canister as claimed in claim 1, wherein said closure is irreversible.

8. A canister as claimed in claim 1, wherein at least one of said inlet and outlet conduits forms one piece with said first portion.

9. A canister as claimed in claim 1, wherein said weld is a friction weld.

10. A canister as claimed in claim 1, wherein one of said first and second portions forms one piece with a male or female element of a shape coupling by which to fix in releasable manner said canister to a stand and keep said canister in a position of use.

11. A canister as claimed in claim 1, wherein said outlet conduit is fitted with a disposable tube connectable releasably to an inflatable article to inject the sealant liquid and/or compressed air.

12. A canister as claimed in claim 1, wherein said closure, in a closed position, separates both said inlet conduit and said outlet conduit from the sealant liquid.

13. A canister as claimed in claim 1 wherein said closure is a preassembled unit connected rigidly, in a closed position, to one of said first and second portions.

14. A canister as claimed in claim 1, wherein both said inlet conduit and said outlet conduit are formed in one piece with said first portion.

15. A canister as claimed in claim 1, wherein said inlet conduit and said outlet conduit are fluidically connected solely by said tank when said closure is open.

16. A canister as claimed in claim 1, wherein the surface of the sealant liquid is above at least one of said inlet and outlet conduits when the sealant liquid is injected.

17. A canister as claimed in claim 1, wherein at least one of said first and second portions has a minimum thickness; and a weld area of a thickness greater than said minimum thickness.

18. A canister as claimed in claim 1, wherein said weld is one in number.

19. A canister as claimed in claim 1, wherein one of said first and second portions is concave and, in a welding position, contains the sealant liquid.

20. A canister as claimed in claim 1, wherein said closure is surrounded by the sealant liquid.

21. A canister as claimed in claim 1, wherein the first and the second portion are made by means of injection molding.

22. A method of producing a disposable canister as claimed in claim 1 comprising an inner closure for retaining sealant liquid inside the canister; a compressed-air inlet conduit; an outlet conduit for receiving the sealant liquid when said closure is in an open position; a first portion having one of said inlet and outlet conduits; and a second portion which, closed on the first portion defines a tank in which the closure retains the sealant liquid, the method comprising the steps of:

fitting said closure to one of said first and second portions; and then welding the first and second portions together to form said canister.

23. A method as claimed in claim 22, characterized in that one of said first and second portions is concave and, in a welding position, contains an amount of sealant liquid suitable for repair; and wherein said first or second concave portion is filled with the sealant liquid prior to said welding step.

24. A method as claimed in claim 22, characterized in that said closure closes at least one of said inlet and outlet conduits; and said fitting step is performed before said first or second concave portion is filled, so as to retain the sealant liquid in one of said first and second portions by means of said closure.

* * * * *

UNITED STATES PATENT AND TRADEMARK OFFICE
CERTIFICATE OF CORRECTION

PATENT NO. : 10,202,235 B2
APPLICATION NO. : 14/911311
DATED : February 12, 2019
INVENTOR(S) : Maurizio Marini It is certified that error appears in the above-identified patent and that said Letters Patent is hereby corrected as shown below:

In the Specification

Column 1, Line 6, insert:
--This application is a 371 of PCT/IB2014/063866, which is a Continuation of U.S. Patent Application No. 13/964,477 filed August 12, 2014.--

Signed and Sealed this
Fourteenth Day of May, 2019

Andrei Iancu
*Director of the United States Patent and Trademark Office*